(12) United States Patent
Noteware et al.

(10) Patent No.: US 9,307,198 B2
(45) Date of Patent: Apr. 5, 2016

(54) ORAL AND VIDEO PROCEEDINGS COLLECTION AND TRANSCRIPTION DEVICE

(71) Applicant: Next Generation Reporting, LLC, Wayne, PA (US)

(72) Inventors: David Noteware, Bryn Mawr, PA (US); Jonathan De Jong, East Norriton, PA (US)

(73) Assignee: Next Generation Reporting, LLC, Wayne, PA (US)

( * ) Notice: Subject to any disclaimer, the term of this patent is extended or adjusted under 35 U.S.C. 154(b) by 74 days.

(21) Appl. No.: 14/148,264

(22) Filed: Jan. 6, 2014

(65) Prior Publication Data

US 2014/0184729 A1 Jul. 3, 2014

Related U.S. Application Data

(63) Continuation of application No. 12/909,667, filed on Oct. 21, 2010, now abandoned.

(60) Provisional application No. 61/272,913, filed on Nov. 18, 2009.

(51) Int. Cl.
*H04N 7/15* (2006.01)
*H04N 7/14* (2006.01)

(52) U.S. Cl.
CPC . *H04N 7/15* (2013.01); *H04N 7/147* (2013.01)

(58) Field of Classification Search
CPC ............ H04N 7/147; H04N 7/14; H04N 7/15
USPC ........ 348/14.01–14.16; 379/202.01; 704/270, 704/201, 270.1
See application file for complete search history.

(56) References Cited

U.S. PATENT DOCUMENTS

| 8,379,821 | B1 * | 2/2013 | Ramage et al. .......... 379/202.01 |
| 2002/0123883 | A1 * | 9/2002 | Jackson et al. ................ 704/201 |
| 2007/0195159 | A1 * | 8/2007 | Packer ....................... 348/14.12 |

* cited by examiner

*Primary Examiner* — Melur Ramakrishnaiah
(74) *Attorney, Agent, or Firm* — Novak Druce Connolly Bove + Quigg LLP (57) ABSTRACT

A system that enables remote participation in a live proceeding includes a first computer configured to transmit and receive audio and video data with a second computer through a network. An audio mixer is configured to combine a first audio signal received from a microphone with a second audio signal received from the first computer to provide a third audio signal. A capture device is coupled to the audio mixer and to the first computer. The capture device is configured to receive the third audio signal from the audio mixer and a video signal from a video camera coupled to the capture device, and to process the third audio signal and the video signal such that audio and video data of the third audio signal and the video signal may be stored in a computer readable storage medium.

12 Claims, 6 Drawing Sheets

ORAL AND VIDEO PROCEEDINGS COLLECTION AND TRANSCRIPTION DEVICE

CROSS-REFERENCE TO RELATED APPLICATIONS

This application is a continuation of U.S. patent application Ser. No. 12/909,667, filed Oct. 21, 2010, and claims priority to U.S. Provisional Patent Application Number 61/272,913 which was filed on Nov. 18, 2009, the entireties of which are herein incorporated by reference.

FIELD

The disclosed system and method relate to real-time video communication through a network. More specifically, the disclosed system and method relate to video communication that enables the transcription of oral proceedings through a network.

BACKGROUND

Conventional oral testimony collection and transcription services typically involve the use of a court reporter who transcribes spoken or recorded speech into written form. The court reporter typically uses machine shorthand or a voice silencer and digital recorder to produce official transcripts of court hearings, depositions, and other official proceedings. In the United States, the court reporter is often also a notary public who is authorized to administer oaths to witnesses and who certifies that her or his transcript of the proceedings is a verbatim account of what was said.

Typically, depositions or other official proceedings take place in a single location, e.g., a conference room at a law firm, business, or the like, where the participants gather. A witness is sworn in and asked a series of questions by one or more attorneys on both sides of the litigation. All oral communication on the record is recorded by the court reporter, and the official transcript of the deposition may be read into evidence at trial. There can be a considerable cost of time and money associated with depositions or other official proceedings as some or all of the participants may not permanently reside near the location where the proceedings are held. Consequently, each of the participants must travel, and in some instances spend a night in a hotel room, in order to attend the proceeding.

SUMMARY

A system is disclosed enabling remote participation in a live proceeding that includes a first computer configured to transmit and receive audio and video data with a second computer through a network. An audio mixer is configured to combine a first audio signal received from a microphone with a second audio signal received from the first computer to provide a third audio signal. A capture device is coupled to the audio mixer and to the first computer. The capture device is configured to receive the third audio signal from the audio mixer and a video signal from a video camera coupled to the capture device and to process the third audio signal and the video signal such that audio and video data of the third audio signal and the video signal may be stored in a computer readable storage medium.

Also disclosed is a system enabling remote participation in a live proceeding that includes a computing device comprising a processor and a computer readable storage medium in communication with the processor. The processor is configured to execute instructions stored in the computer readable storage medium. A first audio splitter has a microphone coupled to a first input, a first output of the audio splitter is coupled to an audio input of the computing device, and a second output of the audio splitter is coupled to a first input of an audio mixer. A second audio splitter has an input coupled to an audio output of the computing device, a first output of the second audio splitter is coupled to a speaker, and a second output of the second audio splitter is coupled to a second input of the audio mixer. The audio mixer is configured to combine a first audio signal received from the microphone and a second audio signal received from the audio output of the computing device into a third audio signal. An audio and video capture device is coupled to the computing device, to an output of the audio mixer, and to an output of a video camera. The audio and video capture device is configured to process a video signal received from the video camera and the third audio signal received from the audio mixer such that data comprising the video and third audio signals may be stored in the computer readable storage medium.

A method of communicating and recording a live proceeding is also disclosed. The method includes establishing a network connection to a computer disposed at a remote location, receiving first audio data from the computer through the network connection, and outputting the first audio data received from the computer to a speaker and to a sound mixer. Second audio data are received from a microphone and are output to the sound mixer. An audio signal, which is a combination of the first and second audio data, is output from the sound mixer to an audio and video capture device. Video data received from a video camera and the combination of the first and second audio data are stored in a computer readable storage medium.

BRIEF DESCRIPTION OF THE DRAWINGS

These and other features and advantages of the present invention will be more fully disclosed in, or rendered obvious by, the following detailed description of the preferred embodiment of the invention, which is to be considered together with the accompanying drawings wherein.

DETAILED DESCRIPTION

A system is disclosed that enables participants disposed at remote locations to participate in a deposition or other proceeding such as, for example, hearings, arbitrations, and the like. The system includes a computing device configured to transmit and receive audio and video data with a second computer through a network. An audio mixer combines a first audio signal received from a microphone with a second audio signal received from the first computer to provide a third audio signal. An audio and video ("A/V") capture device is coupled to the audio mixer and to the first computer. The A/V capture device receives the third audio signal from the audio mixer and a video signal from a video camera that is coupled to the A/V capture device and processes the third audio signal and the video signal such that audio and video data of the third audio signal and the video signal may be stored in a computer readable storage medium of the first computer.

In addition to enabling remote participation in a deposition or other proceeding, the system advantageously provides the ability to pause the recording of the proceeding while maintaining the connection between the local participants and the remote participants. Consequently, the system enables the ability for "off-the-record discussions" between the participants located at the site of the proceeding, i.e., local participants, and remote participants, i.e., those participants that participate by way of the network connection. The ability to go off-the-record reduces the amount of editing needed to the audio and/or video record of the proceeding as well as the cost of creating the audio and/or video records. Additionally, the system may be implemented in a compact design that may be easily transported and does not require the attendance of all participants at a single location thereby reducing travel time and increasing the flexibility of where and when a deposition or other live proceeding may take place.

Figure 1:
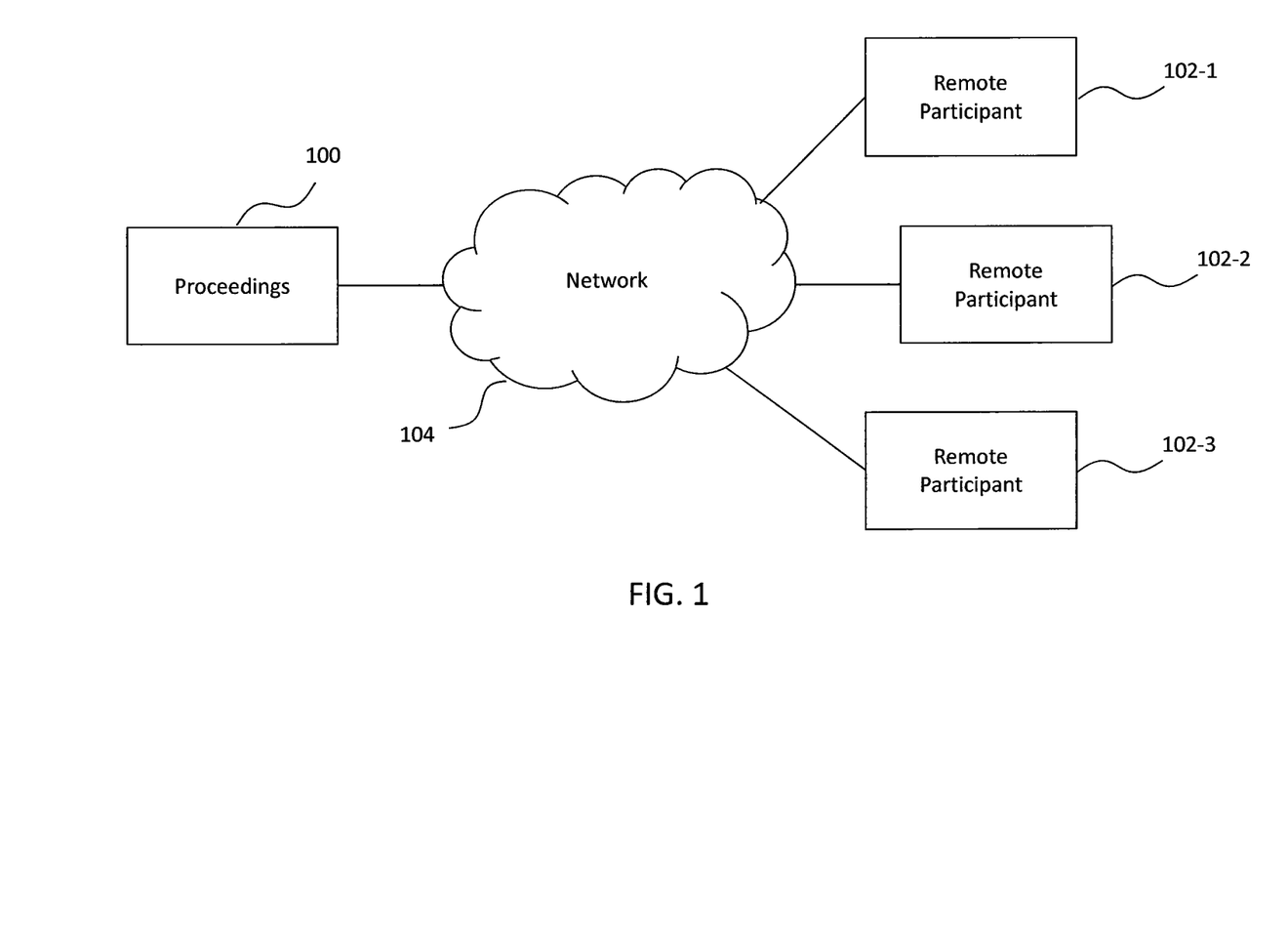
FIG. 1 is a diagram of one example of the physical locations of the participants in a proceeding.

FIG. 1 illustrates one example of a deposition or other proceeding 100 attended by one or more local participants such as, for example, a deponent and one or more attorneys, and one or more remote participants 102-1, 102-2, and 102-3 (collectively referred to as "remote participants 102"). Remote participants 102 may include one or more attorneys and/or a court reporter. Each of the remote participants 102 may be located at separate locations, which are also separate from the location of the deposition 100. As shown in FIG. 1, each of the local participants located at the deposition 100 and the remote participants 102 may communicate with one another in real time through a network or other communication medium 104. In one embodiment, communication medium is the Internet, although one skilled in the art will understand that communication medium may be another network such as, for example, a local area network ("LAN"), a wide area network ("WAN"), or the like. The court reporter, which may be at the deposition 100 or be one of the remote participants 102, may transcribe all the oral elements of the proceeding and seek clarifications as necessary.

Figure 2:
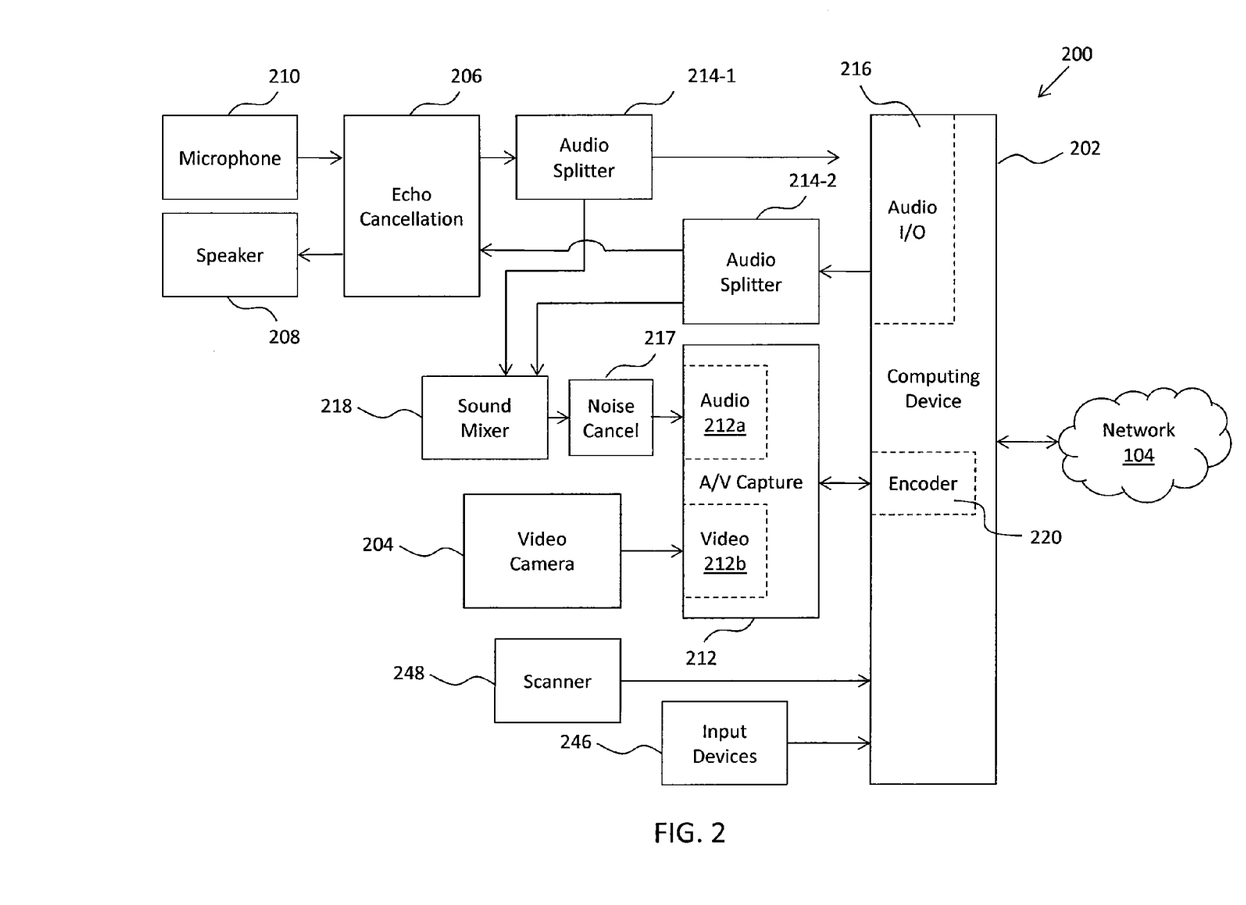
FIG. 2 is a diagram of the configuration of equipment at the location of the proceeding.

FIG. 2 is a block diagram of one example of a system 200 for communicating and transmitting the proceedings 100 to remote participants 102 (FIG. 1). As shown in FIG. 2, system 200 includes a computing device 202 coupled to a video camera 204, echo cancellation device 206, which is coupled to a speaker 208 and to a microphone 210, and an A/V capture device 212. A pair of audio splitters 214-1 and 214-2 (collectively referred to as "splitters 214" or "audio splitters 214") are coupled to echo cancellation device 206 and to the respective audio input and output ports ("audio I/O") 216 of computing device 202. A sound mixer 218 is coupled to splitters 214 and to the audio input port 212a of A/V capture device 212 through a noise cancellation device 217. Video camera 204 is coupled to the video input port 212b of A/V capture device 212, which is coupled to an encoder 220 of computing device 202.

Figure 3:
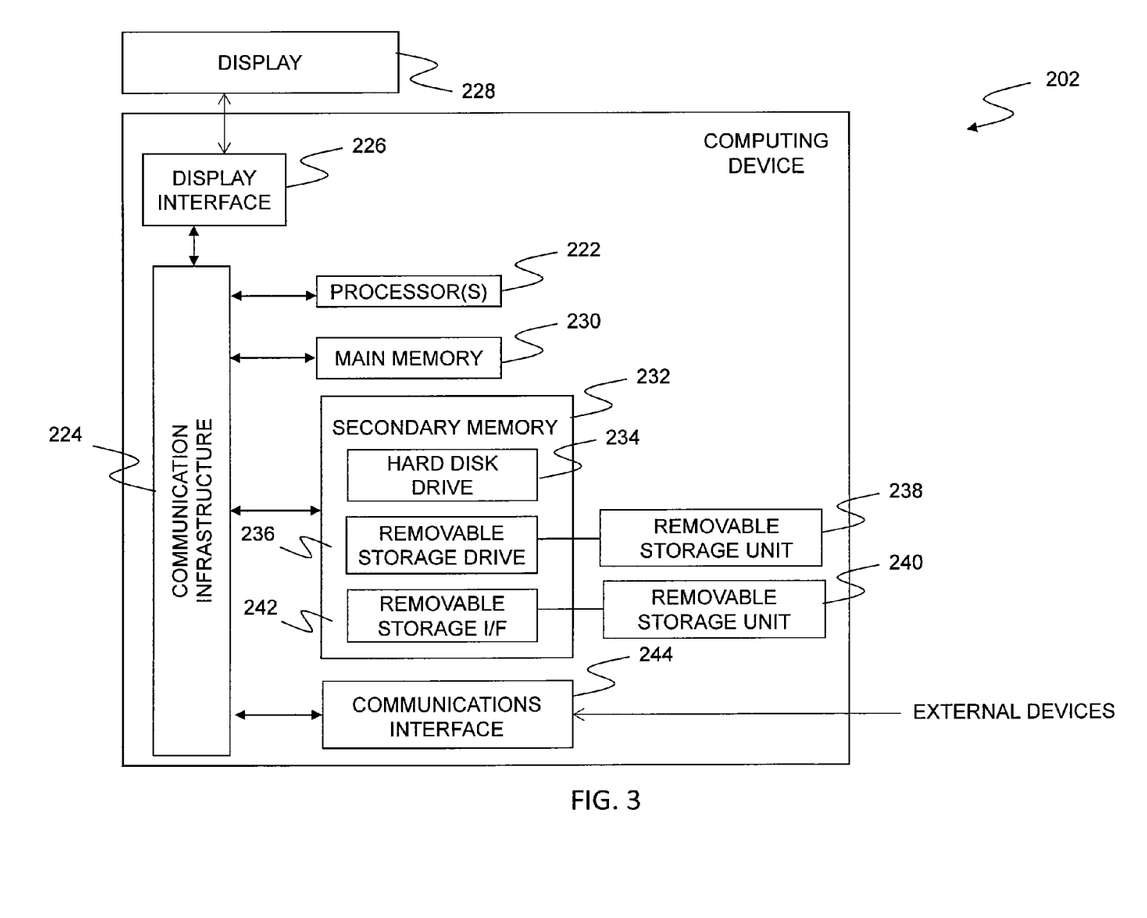
FIG. 3 is a block diagram of one example of an architecture of a computing device in accordance with the systems illustrated in FIGS. 2 and 4.

Computing device 202 may be a general purpose computer having an architecture as illustrated in FIG. 3. As shown in FIG. 3, computing device 202 may include, in addition to audio I/O ports 216 and encoder 220 illustrated in FIG. 2, one or more processors, such as processor(s) 222. Processor(s) 222 may be any central processing unit ("CPU"), microprocessor, micro-controller, or computational device or circuit for executing instructions and be connected to a communication infrastructure 224 (e.g., a communications bus, crossover bar, or network). Various software embodiments are described in terms of this exemplary computing device 202. After reading this description, it will be apparent to one skilled in the art how to implement the method using other computer systems or architectures.

Computing device 202 may include a display interface 226 that forwards graphics, text, and other data from the communication infrastructure 224 (or from a frame buffer not shown) for display on a monitor or display unit 228.

Computer system also includes a main memory 230, such as a random access (RAM) memory, and may also include a secondary memory 232. Secondary memory 232 may include a more persistent memory such as, for example, a hard disk drive 234 and/or removable storage drive 236, representing a floppy disk drive, a magnetic tape drive, an optical disk drive, or the like. Removable storage drive 236 reads from and/or writes to a removable storage unit 238 in a manner that is understood by one skilled in the art. Removable storage unit 238 represents a floppy disk, magnetic tape, optical disk, or the like, which may be read by and written to by removable storage drive 236. As will be understood by one skilled in the art, the removable storage unit 238 may include a computer usable storage medium having stored therein computer software and/or data.

In some embodiments, secondary memory 232 may include other devices for allowing computer programs or other instructions to be loaded into computing device 202. Such devices may include, for example, a removable storage unit 240 and a corresponding interface 242. Examples of such units 240 interfaces 242 may include a program cartridge and cartridge interface (such as that found in video game devices), a removable memory chip (such as an erasable programmable read only memory ("EPROM")), or programmable read only memory ("PROM")) and associated socket, and other removable storage units 240 and interfaces 242, which allow software and data to be transferred from the removable storage unit 240 to computing device 202.

Computing device 202 may also include one or more communication interfaces 244, which allows software and data to be transferred between computing device 202 and external devices such as, for example, camera 204, speaker 208, microphone 210, scanner 248, and other computing devices and computer peripheral devices that may be located at remote locations through network 104. Examples of the one or more communication interfaces 244 may include, but are not limited to, a modem, a network interface (such as an Ethernet card or wireless card), a communications port, a Personal Computer Memory Card International Association ("PCMCIA") slot and card, one or more Personal Component Interconnect ("PCI") Express slot and cards, or any combination thereof. In some embodiments, multiple PCI Express slots are utilized by integrating an ExpressBox available from Magma Mission Technology Group, Inc. of San Diego, Calif. with computing device 202. Software and data transferred via communications interface 244 are in the form of signals, which may be electronic, electromagnetic, optical, or other signals capable of being received by communications interface 244. These signals are provided to communications interface 244 via a communications path or channel. The channel may be implemented using wire or cable, fiber optics, a telephone line, a cellular link, a radio frequency ("RF") link, or other communication channels.

In this document, the terms "computer program medium" and "computer readable medium" refer to media such as removable storage units 238, 240, or a hard disk installed in hard disk drive 234. These computer program products provide software to computing device 202. Computer programs (also referred to as "computer control logic") may be stored in main memory 230 and/or secondary memory 232. Computer programs may also be received via communications interface 244. Such computer programs, when executed by a processor(s) 222, enable the computing device 202 to perform the features of the method discussed herein.

In an embodiment where the method is implemented using software, the software may be stored in a computer program product and loaded into computing device 202 using removable storage drive 236, hard drive 234, or communications interface 244. The software, when executed by a processor(s) 222, causes the processor(s) 222 to perform the functions of the method described herein. In another embodiment, the method is implemented primarily in hardware using, for example, hardware components such as application specific integrated circuits ("ASICs"). Implementation of the hardware state machine so as to perform the functions described herein will be understood by persons skilled in the art. In yet another embodiment, the method is implemented using a combination of both hardware and software.

In some embodiments, some or all of video camera 204, echo cancellation device 206, speaker 208, and microphone 210 may be incorporated into computing device 202 or be stand-alone devices. For example, echo cancellation device 206 may be a stand-alone piece of equipment, an integrated process or device within another component (e.g., speaker 208 and microphone 210), or a software solution that achieves the same result. In one embodiment in which camera 204, echo cancellation device 206, speaker 208, and microphone 210 are separate devices, video camera 204 is a Webbie™ MHS-CM1 HD camcorder available from Sony Corporation of America of New York, N.Y.

Speaker 208 may be the internal speakers of the computing device 202 or it may be a separate component, such as AX210 PC multimedia speakers available from Dell Inc. of Round Rock, Tex., which may be coupled to computing device 202 by a universal serial bus ("USB") connection, an RCA connection, a 3.175 mm (⅛ inch) tip, ring, sleeve ("TRS") connector, a wireless connection, or the like. Microphone 210 may be the internal microphone of the computing device 202 or it may be a peripheral component connected to computing device 202. One example of microphone 210 is an AccuMic® PC available from ClearOne Communications of Salt Lake City, Utah, which includes the echo cancellation functionality of echo cancellation device 206. In some embodiments, microphone 210 includes echo cancelling device 206 through a direct coupling to audio splitters 214 and speaker 208. For example, microphone 210 may be configured to reduce the echo between the audio signals emitted by speaker 208 and received by microphone 210 by sampling the audio signal transmitted to speaker 208 and then cancelling corresponding signals received at microphone 210.

In some embodiments, A/V capture device 212 is an audio/video capture card coupled to computing device 202. One example of A/V capture device 212 is an Osprey® 240e with SimulStream® video capture card available from ViewCast® of Plano, Tex., which connects to computing device 202 through a PCI Express connection, such as one of the communication interfaces 244 (e.g., one of the PCI Express ports provided by the ExpressBox described above). A/V capture device 212 may interface with video camera 204 through an S-video or Y/C connection, a Super Video Graphics Array ("SVGA") connection, or an Ultra VGA ("UVGA"), to name a few of the possible connection types. A/V capture device 212 may be coupled to microphone 210 and/or to sound mixer 218 by a TRS connector, an RCA connector, or the like.

Audio splitters 214 may be any audio splitter that replicates an incoming audio signal to two or more output ports. As will be understood by one skilled in the art, splitters 214 may be a female input to two male outputs, a single male input to two female outputs, a single female input to two female outputs, or any other combination of male and female connections depending on the inputs and outputs of the devices to which audio splitters 214 connect.

Noise cancelling device 217 may be configured to reduce and/or remove a hum introduced in ground loops in system 200. In some embodiments, noise cancelling devices 217 are a CleanBox II available from Applied Research and Technology of Rochester, N.Y. and a noise-reducing audio cable available from Griffin Technology of Nashville, Tenn. As shown in FIG. 2, noise cancellation device 217 is coupled between sound mixer 218 and A/V capture device 212.

Sound mixer 218 may be any device configured to mix or combine audio signals from two separate sources (e.g., directly to local microphone and to a remote microphone through the network 104). In some embodiments, sound mixer 218 is a Powermix II 2-channel miniature audio mixer available from Applied Research and Technology of Rochester, N.Y. Mixer 218 may be coupled to A/V capture device 212 and to audio splitters 214 through TRS connectors, RCA connectors, or the like.

Encoder 220 may be any software or hardware component for converting audio and video data received from A/V capture device 212 into a file format that may be saved in a computer readable storage medium, such as main memory 230 or secondary memory 232, of computing device 202 and be replayed by computing device 202 and/or any other device for playing electrically stored audio and video files. In one embodiment, encoder 220 is a Windows Media encoder or an Expression Encoder 4 available from the Microsoft Corporation of Redmond, Wash.

A scanner 248 may also be coupled to computing device 202 so that exhibits presented during proceeding 100 may be scanned and stored in a computer readable storage medium 230, 232 by one of the local participants of proceeding 100, e.g., a trained technician or the court reporter. In some embodiments, scanner 248 is a Xerox 7600 Scanner available from the Xerox Corporation of Norwalk, Conn. Scanner 248 may be coupled to computing device 202 through a USB connection, although one skilled in the art will understand that scanner 248 may be coupled to computing device 202 through other wireless or wired connections such as, for example, a personal area network ("PAN") including, but not limited to, a PAN in accordance with the Bluetooth technology standard. The documents scanned at proceeding 100 may become part of the permanent and official record of the proceeding and may be displayed to the remote participants 102 on a display 228 as soon as the scan of the documents has been completed.

One or more input devices 246 are also coupled to computing device 202 that allow a user to input data and commands to computing devices 202. Input devices 246 include, but are not limited to, a mouse, trackball, keyboard, touchpad and associated buttons, remote control, to name a few possibilities. In some embodiments, input device 246 may be a touch screen display such that a user may use his/her fingers, a stylus, a pen, or the like to input data by contacting or touching the screen of the touch screen display. As will be understood by one skilled in the art, input devices 246 may be incorporated into computing device 202 or be stand-alone devices. In embodiments where input devices 246 are stand alone devices, input devices 246 may be coupled to computing device 202 through a USB connection, wirelessly in accordance with the Bluetooth technology standard, a PS/2 connector, or the like.

One skilled in the art will understand that FIG. 2 does not illustrate every component of system 200. For example, power cords and connectors used to connect each of the components are not shown.

Additionally, web conferencing software may be stored in a computer readable storage medium, such as, for example, in main memory 230 and/or secondary memory 232 of computing device 202. The web conferencing software may be utilized to establish and maintain real time audio and visual communication between local participants of the proceeding 100 and remote participants 102 (FIG. 1) through network 104. In one embodiment, the web conferencing software may be VidyoDesktop™ available from Vidyo, Inc. of Hackensack, N.J., although one skilled in the art will understand that other web conferencing, telepresence, or video streaming software packages may be implemented.

Figure 4:
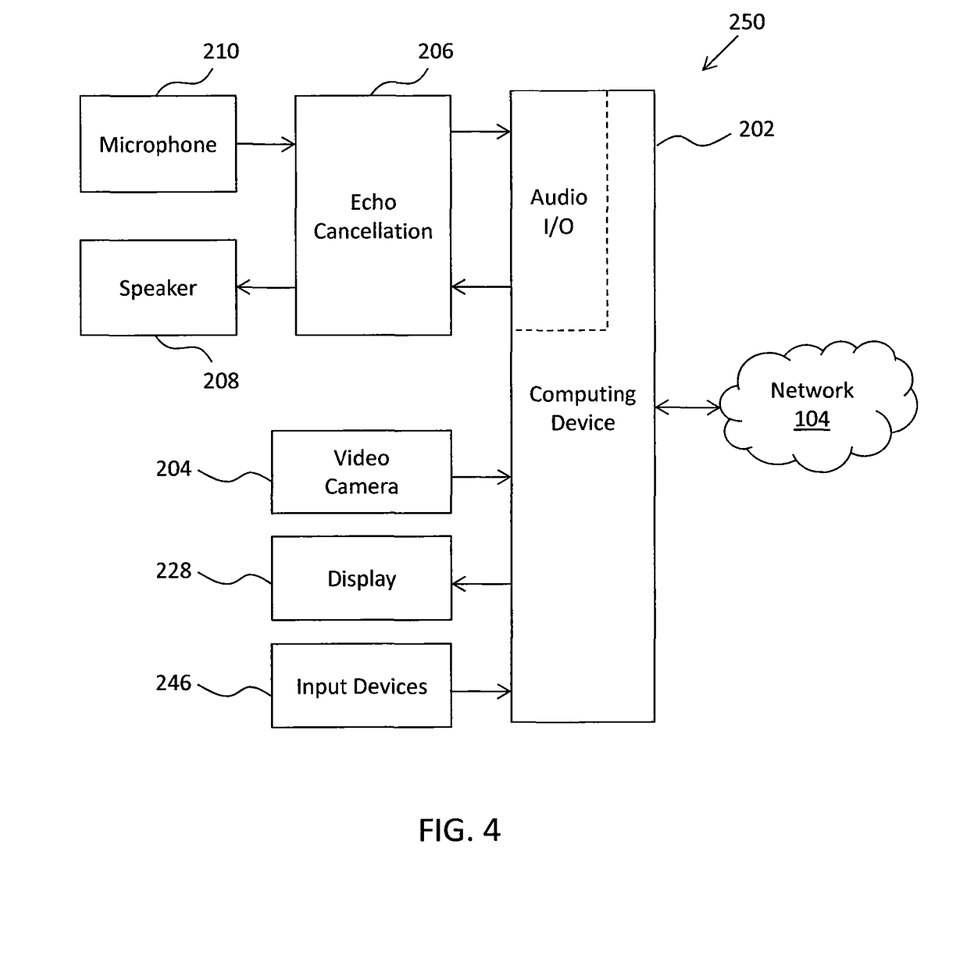
FIG. 4 is a diagram of a configuration of equipment at the location where a remote participant engages in the proceeding.

FIG. 4 is a block diagram of one example of a system 250 that may be located at a remote location with respect to the proceedings 100 and utilized to view and/or participate in proceedings 100. The components or elements of system 250 that are the same or similar to the components of system 200 have the same reference numerals, and detailed descriptions of these like components are not repeated. As shown in FIG. 4, system 250 includes a computing device 202 in signal communication with network 104. Computing device 202 may be coupled to a video camera 204, a display 228, and one or more input devices 246. Additionally, microphone 210 and speaker 208 are respectively coupled to the audio I/O ports 216 of computing device 202 through echo cancelling device 206. In some embodiments, one or more of video camera 204, echo cancellation device 206, speaker 208, microphone 210, and display 228 may be incorporated into the same device. For example, computing device 202 may be a laptop or desktop computer configured with an integrated webcam 204, echo cancelling device 206, speaker 208, and microphone 210. Additionally, computing device 202 may include an integrated wireless or wired network card for connecting computing device 202 to network 104. Web conferencing software may also be installed in computing device 202 as will be understood by one skilled in the art.

Figure 5:
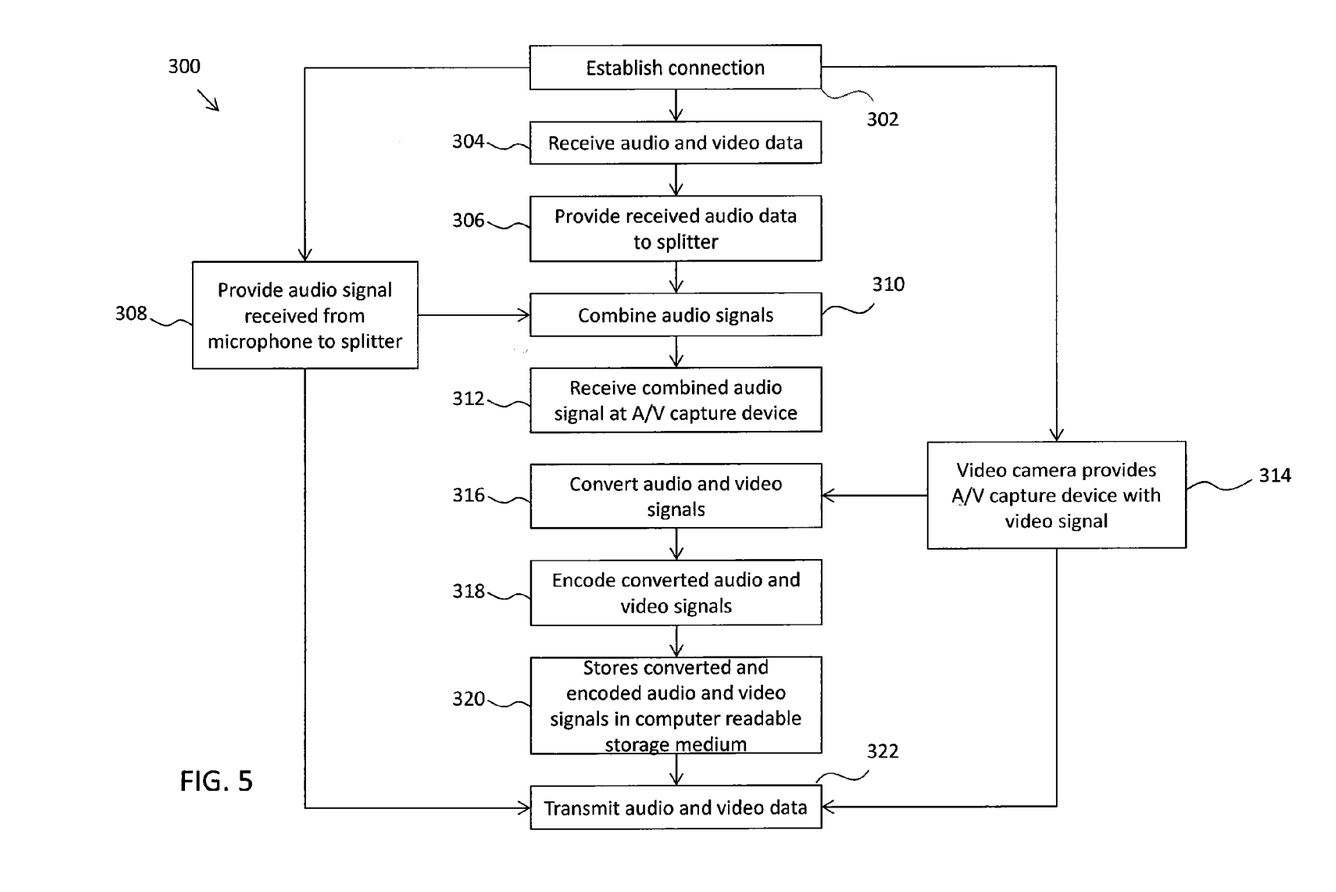
FIG. 5 is a diagram of a recording method at the location of the proceeding.

The operation of systems 200 and 250 are described with reference to FIGS. 1-5 in which FIG. 5 is a flow chart of one example of a deposition or other proceeding that utilizes the systems 200, 250 described above. At block 302, a connection is established between system 200 and system 250. To establish the connection between systems 200 and 250, each of the computing devices 202 are powered on and the web conference software is loaded by the one or more processor(s) 222 in the computing devices 202. As described above, the web conference software is used to connect computing devices 202 of systems 200 and 250 to each other through network 104, which may be a WAN, LAN, or the Internet as will be understood by one skilled in the art. The web conferencing software may be loaded in response to a user input received by computing devices 202 from input devices 246. Additionally, the web conferencing software may present one or more graphical user interfaces ("GUIs") to a user on display 228 through which the user controls the operation of systems 200 and 250 by manipulating input devices 246.

Audio and video data are transmitted between computing devices 202 of systems 200 and 250 at block 304. For example, system 250, which is located at a remote location to proceedings 100, i.e., at the location of a remote participant 102, transmits sounds received at microphone 210 coupled to computing device 202 through network 104 to system 200. Similarly, video camera 204 acquires video images of a remote participant and transmits the video data to computing device 202, which then forwards the video data to computing device 202 of system 200 through network 104.

The audio and video data transmitted in real time from system 200 to system 250 is acquired by steps 308-320 of method 300 described below, which one skilled in the art will understand that some or all of the steps may be performed before, concurrently with, or after the other steps in method 300. Video data received from computing device 202 of system 250 may be displayed on display 228 of system 200 so that local participants may view the remote participant.

At block 306, computing device 202 of system 200 forwards the audio data received from computing device 202 of system 250 through network 104 to audio splitter 214-2, which is coupled to an audio output port 216 of computing device 202 of system 200. The audio data received by computing device 202 of system 200 may be in a digital form, which computing device 202 converts to an analog form that it output by the audio output port of audio I/O 216. Splitter 214-2 outputs one audio signal to speaker 208 and another audio signal to sound mixer 218. Speaker 208 outputs a sound based on the received audio signal, which includes the speech or other noise made by a remote participant and acquired by microphone 210 of system 250.

In a similar manner, microphone 210 of system 200 converts acoustic energy emitted by the local participants at proceedings 100 to electrical signals, which may be in analog form, that are transmitted to audio splitter 214-1 at block 308. Audio splitter 214-1 outputs an audio signal to sound mixer 218 and to an audio input port of audio I/O 216. Computing device 202 of system 200 may convert the analog audio signal to a digital signal and forward the digitized audio signal to computing device 202 of system 250 through network 104. Computing device 202 of system 250 converts the digital audio signal received from system 200 to an analog signal, which is then provided to speaker 208 such that remote participants hear the proceedings 100 in real time.

At block 310, sound mixer outputs an audio signal that is a combination of the audio signals received from splitter 214-1 and splitter 214-2. The combined audio signal output by mixer 218 is passed through noise cancellation device 217, which reduces and/or eliminates a hum introduced by a ground loop of system 200, and is received at audio input 212a of A/V capture device 212 at block 312. At block 314, video camera 204 of system 200 outputs a video signal, which is received at the video input 216b of A/V capture device 212. The video signal supplied by video camera 204 of system 200 includes images of proceedings 100, which may be a deposition or other proceeding as described above.

A/V capture device 212 converts the analog audio and video signals received from sound mixer 218 and video camera 204 of system 200 to digital signals as well as performs additional processing at block 316 as will be understood by one skilled in the art. A/V capture device 212 outputs the digitized and processed versions of the audio and video signals received from sound mixer 218 and video camera 204 to encoder 220 of computing device 202 of system 200.

At block 318, encoder 220 converts the digitized and processed audio and video data received from A/V capture device 212 to a file format that may be saved in a computer readable storage medium and/or played on a computer or other device for reading data stored in an electronic form. Computing device 202 of system 200 stores the converted and encoded audio and video data to a computer readable storage medium, such as to main memory 230 and/or to secondary memory 232, at block 320. The stored audio and video file may become the official record of the deposition or official proceedings.

At block 322, the audio data received from microphone 210 at block 308 and the video data received from video camera 204 is transmitted by computing device 202 of system 200 to computing device 202 of system 250 at block 322 where the video data is displayed on a display 228 and the audio is output to a speaker 208 such that the remote participants may see and hear the proceeding.

Figure 6:
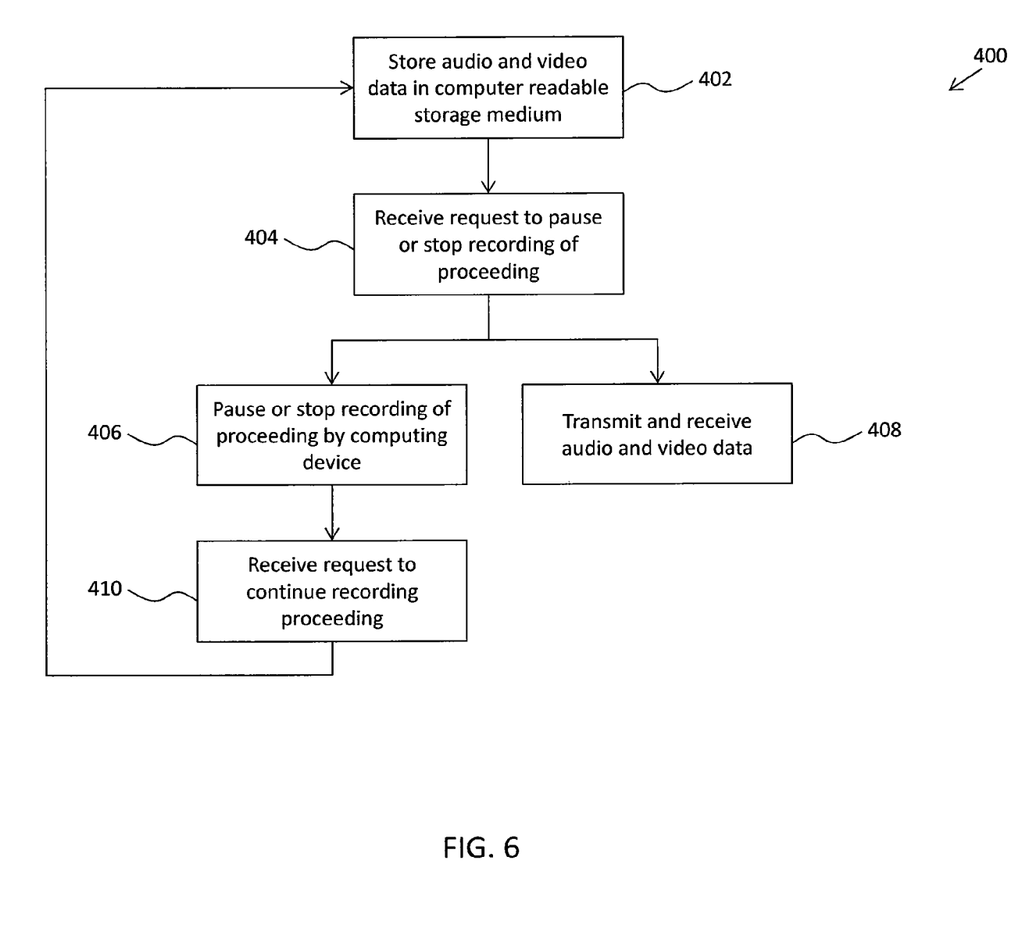
FIG. 6 is diagram of one example of pausing the recording of a proceeding while maintaining communication between the participants.

In addition to enabling the remote participation in the proceedings through network 104, system 200 also advantageously provides the ability to have off-the-record discussions between all participants, local and remote, without interrupting communication between the participants. FIG. 6 is a flow chart of one example of a method 400 of pausing a recording of the deposition or proceedings 100. As will be understood by one skilled in the art, method 400 may be a subroutine or other method that is performed simultaneously with method 300 described above.

As shown in FIG. 6, system 200 is recording the audio and video data of the proceeding at block 402. At block 404, a request to pause or stop the recording of the proceeding is received at computing device 202 of system 200. The request to pause or stop the recording of proceeding 100 may be in the form of an electronic signal generated by a user of system 200 or system 250 by a user manipulating input devices 246. The user may utilize input devices 246 to "click" on a GUI, which causes a software subroutine to run.

At block 406, computing device 202 stops recording data received from A/V capture device 212 in response to receiving the signal requesting to pause or stop recording the proceeding 100. Although computing device 202 stops storing the audio and video of proceedings 100 in the computer readable storage medium, the audio and video data of the proceeding and of the remote participants continues to be transmitted between systems 200 and 250, i.e., the connection between systems 200 and 250 through network 104 is maintained, at block 408. One skilled in the art will understand that computing device 202 may continue to locally store audio and video data received from A/V capture device 212 in a less temporary manner in order to maintain communications between systems 200 and 250, but that the more permanent storage of the audio and video data of proceeding 100 will be paused or stopped such that the A/V file, which may become the permanent record of proceeding, will not include any off-the-record comments or images.

At block 410, computing device 202 of system 200 receives a request to continue storing, i.e., recording, the audio and video data of proceedings 100. Like the request to pause or stop recording proceeding 100, the request to continue recording may be in the form of an electronic signal generated in response to a user input received from input devices 246. In response to the request to continue recording received by computing device 202 at block 408, computing device 202 begins storing audio and video data received from A/V capture device 212 in a computer readable storage medium, such as, for example, main memory 230 and/or secondary memory 232, in a more permanent fashion at block 402. One skilled in the art will understand that the audio and video data received from A/V capture device 212 may be stored in locally or remotely located computer readable storage medium.

The systems and methods described herein advantageously provide the ability to pause the recording of the live proceedings, such as a deposition or other oral testimony, while maintaining the connection, i.e., the ability to continue communication through audio and video, between the local participants and the remote participants. Thus, the systems and methods provide the ability for off-the-record discussions between the participants located at the site of the proceedings, i.e., local participants, and remote participants, i.e., those participants watching the proceedings by way of the network connection without the off-the-record discussions being recorded. The ability to go off-the-record without recording reduces the amount of editing needed to the audio and/or video record of the proceedings as well as the cost of creating the audio and/or video records. Additionally, the components of the systems disclosed herein may be implemented in a compact design providing ease of transportation while at the same time enabling the attendance of remote participants thereby reducing or eliminating travel time and increasing the flexibility of where and when a deposition or other live proceeding may occur.

As described above, the present invention may be embodied in the form of computer-implemented processes and apparatus for practicing those processes. The present invention may also be embodied in the form of computer program code embodied in tangible machine readable storage media, such as random access memory ("RAM"), floppy diskettes, read only memories ("ROMs"), CD-ROMs, DVDs, Bluray discs, optical discs, hard disk drives, flash memories, or any other machine-readable storage medium, wherein, when the computer program code is loaded into and executed by a computer, the computer becomes an apparatus for practicing the invention. The present invention may also be embodied in the form of computer program code loaded into and/or executed by a computer, such that, when the computer program code is loaded into and executed by a computer, the computer becomes an apparatus for practicing the invention. When implemented on a general-purpose processor, the computer program code segments configure the processor to create specific logic circuits. The invention may alternatively be embodied in a digital signal processor formed of application specific integrated circuits for performing a method according to the principles of the invention.

Although the systems and methods have been described in terms of exemplary embodiments, they are not limited thereto. Rather, the appended claims should be construed broadly, to include other variants and embodiments of the systems and methods, which may be made by those skilled in the art without departing from the scope and range of equivalents of the systems and methods.

What is claimed is:

1. A communication system, comprising:
   a first computer configured to transmit and receive audio and video data with a second computer through a network;
   a speaker coupled to the first computer and configured to output real-time audio based on the audio data received from the second computer;
   a display coupled to the first computer configured to output real-time video based on the video data received from the second computer;
   an audio mixer configured to combine a first audio signal received from a microphone with a second audio signal received from the first computer to provide a third audio signal; and a capture device coupled to the audio mixer and to the first computer, the capture device configured to receive the third audio signal from the audio mixer and a video signal from a video camera coupled to the capture device, process the third audio signal and the video signal such that audio and video data of the third audio signal and the video signal may be stored in a computer readable storage medium, and pause processing of the audio and video data without interrupting the transmission and receipt of audio and video data between the first and the second computer through the network such that at least the speaker and display coupled to the first computer respectively continue to output audio and video received from the second computer in real time.

2. The system of claim 1, further comprising a first splitter having an input coupled to an audio output of the first computer, a first output coupled to an input of the audio mixer, and a second output coupled to the speaker.

3. The system of claim 2, further comprising a second splitter having an input coupled to an output of the microphone, a first output coupled to an input of the audio mixer, and a second output coupled to an audio input of the first computer.

4. The system of claim 1, wherein the second audio signal received from the first computer is received by the first computer by way of the network from a second microphone directly coupled to the second computer.

5. A communication method, comprising:
establishing a network connection to a computer disposed at a remote location;
receiving first audio data from the computer through the network connection;
outputting the first audio data received from the computer to a speaker and to a sound mixer;
outputting second audio data received from a microphone to the sound mixer;
storing video data received from a video camera and the combination of the first and second audio data in a computer readable storage medium;
displaying real-time images on a display based on video data received from the computer; and in response to receiving a pause signal, ceasing to store the video data and the combination of the first and second audio data in a computer readable storage medium while continuing to maintain the network connection with the computer, display real time images, and output audio to the speaker.

6. The method of claim 5, further comprising:
receiving a second signal from a user to restart storing the video data and the combination of the first and second audio data in the computer readable storage medium; and
storing the video data and the combination of the first and second audio data in the computer readable storage medium in response to receiving the second signal.

7. The method of claim 6, wherein the first audio data is output to the speaker and to the audio mixer from a first audio splitter coupled to an audio output of a computer.

8. The method of claim 7, further comprising transmitting audio and video data to the computer through the network connection.

9. The method of claim 8, wherein the second audio data received from the microphone is output to the audio mixer through a splitter that also outputs the second audio data to an audio input port of a computer.

10. A non-trnsitory computer readable storage medium encoded with program code, wherein when the program code is executed by a processor, the processor performs a method comprising:
establishing a network connection to a computer disposed at a remote location;
receiving first audio data from the computer through the network connection;
causing the first audio data received from the computer to be output to a speaker and to a sound mixer;
causing second audio data received from a microphone to be output to the sound mixer;
causing an audio signal including a combination of the first and second audio data to be output from the sound mixer to an audio and video capture device;
causing real-time images to be displayed on a display based on video data received from the computer; and
in response to receiving a pause signal, causing the storing of the video data and the combination of the first and second audio data in a computer readable storage medium to cease while continuing to maintain the network connection with the computer, the displaying of real time images on a display, and the output of audio data to the speaker.

11. The computer readable storage medium of claim 10, wherein the method includes encoding audio and video data.

12. The computer readable storage medium of claim 11, wherein the method includes causing audio and video data received from the microphone and the video camera to be transmitted to the computer disposed at the remote location through the network in real time.

* * * * *